(12) United States Patent
Sudo

(10) Patent No.: US 7,161,632 B2
(45) Date of Patent: Jan. 9, 2007

(54) VIDEO TERMINAL, VIDEO TERMINAL COMMUNICATING SYSTEM, AND VIDEOCONFERENCE SYSTEM

(75) Inventor: Satoru Sudo, Osaka (JP)

(73) Assignee: Ginganet Corporation, Osaka (JP)

( * ) Notice: Subject to any disclaimer, the term of this patent is extended or adjusted under 35 U.S.C. 154(b) by 530 days.

(21) Appl. No.: 10/433,325

(22) PCT Filed: Dec. 1, 2000

(86) PCT No.: PCT/JP00/08519

§ 371 (c)(1),
(2), (4) Date: Oct. 3, 2003

(87) PCT Pub. No.: WO02/45426

PCT Pub. Date: Jun. 6, 2002

(65) Prior Publication Data

US 2004/0051780 A1    Mar. 18, 2004

(51) Int. Cl.
*H04N 5/44* (2006.01)

(52) U.S. Cl. ..................................... 348/565

(58) Field of Classification Search ......... 348/565–569
See application file for complete search history.

(56) References Cited

U.S. PATENT DOCUMENTS

| 4,931,872 A | * | 6/1990 | Stoddard et al. ............ 348/588 |
| 5,280,540 A | * | 1/1994 | Addeo et al. ............... 348/14.1 |
| 5,734,436 A | * | 3/1998 | Abe et al. .................... 348/564 |
| 5,754,177 A | * | 5/1998 | Hama et al. ................. 715/862 |
| 5,767,897 A | * | 6/1998 | Howell ...................... 348/14.07 |
| 5,867,209 A | * | 2/1999 | Irie et al. .................. 348/14.15 |
| 5,978,046 A | * | 11/1999 | Shintani ...................... 348/589 |
| 6,075,571 A | * | 6/2000 | Kuthyar et al. ............. 348/584 |
| 6,384,868 B1 | * | 5/2002 | Oguma ........................ 348/564 |
| 6,456,335 B1 | * | 9/2002 | Miura et al. ................. 348/588 |
| 2005/0078101 A1 | * | 4/2005 | Shigeta ....................... 345/204 |

FOREIGN PATENT DOCUMENTS

| EP | 0 766 463 A2 | | 4/1997 |
| JP | 3-3586 | | 1/1991 |
| JP | 4-321396 | | 11/1992 |
| JP | 6-121303 | | 4/1994 |
| JP | 6233288 | * | 6/1994 |
| JP | 6-189303 | | 7/1994 |
| JP | 6-233288 | | 8/1994 |
| JP | 9-121333 | | 5/1997 |
| JP | 2000-78553 | | 3/2000 |

\* cited by examiner

*Primary Examiner*—Paulos M. Natnael
(74) *Attorney, Agent, or Firm*—Wenderoth, Lind & Ponack, L.L.P.

(57) ABSTRACT

The screen layout of a main screen and a subscreen is optimized, depending on the types of images to be displayed on the main screen and the subscreen. A video terminal, capable of displaying a subscreen within a main screen, is equipped with a signal control unit 15 as means for optimizing the main screen/subscreen layout, depending on the types of images to be displayed on the main screen and the subscreen. When the main screen is in a split composite screen mode, the signal control unit 15 allows a subscreen to be displayed on a screen of a television 11, with the subscreen occupying one section of the split composite screen. When the main screen is in a full screen mode, the signal control unit 15 allows a subscreen to be diminished.

14 Claims, 3 Drawing Sheets

VIDEO TERMINAL, VIDEO TERMINAL COMMUNICATING SYSTEM, AND VIDEOCONFERENCE SYSTEM

FIELD OF THE INVENTION

The present invention relates to a video terminal such as a videophone terminal and a video conferencing terminal. In more detail, the invention relates to a video terminal which is capable of displaying a subscreen within a main screen, and a video terminal communication system and a video conferencing system using such video terminals.

BACKGROUND ART

Conventionally, there has been a video terminal which is capable of displaying a subscreen (e.g. a 1/9-size subscreen) within a main screen, with the subscreen being arranged to display animations. In this conventional video terminal, users can select what to display on the main screen and the subscreen and where to place the subscreen on the display (specifically, wherever of four areas: top left, bottom left, top right, and bottom right) at their will.

However, no existing system permits automatic selection and switchover of screen layouts of the main screen and the subscreen.

With respect to the video conferencing system, one type of system has been recently gaining popularity, namely, a system which utilizes a multipoint control unit for connecting multiple video terminals via communication lines. The multipoint control unit (MCU) used in this video conferencing system has a continuous presence function. Where video terminals at four locations are connected together, the screen of each terminal is divided into four sections and displays images from all terminals.

While this video terminal displays a four-split composite screen, each section may further contain a subscreen, for example, in 1/9 scale. In this situation, however, the screen layout is so complicated as to spoil the total balance. Besides, when each section of the four-split composite screen includes a 1/9-size subscreen, the view of each section itself is seriously impaired. Further, as far as this four-split composite screen is concerned, one of the four sections contains a subscreen of the identical image (provided that the image is an animation). This is an inefficient screen layout.

The present invention is made in order to solve these problems. An object of the invention is to provide a video terminal, a video terminal communication system, and a video conferencing system, wherein the screen layout of the main screen and the subscreen is automatically changed and optimized through selection of the types of images to be displayed on the main screen and the subscreen.

SUMMARY OF THE INVENTION

In order to solve the above problems, the invention concerns a video terminal which is capable of displaying a subscreen within a main screen. This video terminal is characterized in comprising means for optimizing a screen layout of the main screen and the subscreen, depending on the types of images to be displayed on the main screen and the subscreen.

With respect to the above arrangement, the video terminal of the invention is characterized in that when the subscreen displays a still image, the optimizing means allows the subscreen to be enlarged. Also with respect to the above arrangement, the video terminal of the invention is characterized in that when the main screen is in a split composite screen mode, the optimizing means allows the subscreen to occupy one section of the split composite screen. Besides, when the main screen is in a full screen mode, the optimizing means allows the subscreen to be diminished.

The invention also concerns a video conferencing system which is characterized in comprising multiple video terminals of the above arrangements, and a multipoint control unit which connects these video terminals together via communication lines. This video conferencing system is also characterized in that each of the video terminals selects the type of image to be displayed on the main screen, and that the multipoint control unit determines a display position of the subscreen, depending on the selected type of image to be displayed on the main screen.

The invention further concerns a video terminal communication system which is characterized in comprising video terminals of each of the above arrangements, with a point-to-point connection being established between the video terminals via a communication line. This video terminal communication system is also characterized in that each of the video terminals comprises: transmission means for transmitting a display mode specification command to the other video terminal via the communication line, with a screen layout of the main screen and the subscreen being optimized by the optimizing means and specified by the display mode specification command; receiving means for receiving a display mode specification command which is transmitted from the other video terminal via the communication line; and switching means for switching screen layouts in accordance with the display mode specification command which is received by the receiving means.

The invention again concerns a video conferencing system which is characterized in comprising multiple video terminals of the above arrangements, and a multipoint control unit which connects these video terminals together via communication lines. This video conferencing system is also characterized in that each of the video terminals comprises: transmission means for transmitting display mode specification commands to the multipoint control unit via one of the communication lines, with a screen layout of the main screen and the subscreen being optimized by the optimizing means and specified by the display mode specification commands; receiving means for receiving a display mode specification command which is transmitted from the multipoint control unit via the one communication line; and switching means for switching screen layouts in accordance with the display mode specification command which is received by the receiving means. This video conferencing system is further characterized in that the multipoint control unit comprises relay means for receiving the display mode specification commands from each video terminal and transmitting them to the other video terminals.

The video terminal of the invention, capable of displaying a subscreen within a main screen, is arranged to comprise means for optimizing a screen layout of the main screen and the subscreen, depending on the types of images to be displayed on the main screen and the subscreen. As a result, it is possible to display the main screen and the subscreen in an optimum screen layout, simply by selecting the types of main screen and subscreen.

When the subscreen displays a still image, the video terminal of the invention is arranged to enlarge the subscreen. Accordingly, a still image such as text information can be always displayed on the screen in a clear view.

The video terminal of the invention is arranged to allow the subscreen to occupy one section of the split composite screen. Besides, when the main screen is in a full screen mode, the video terminal is arranged to diminish the subscreen. Therefore, the subscreen can be always displayed in an optimum screen layout, depending on the type of main screen.

The video conferencing system of the invention comprises multiple video terminals and a multipoint control unit which connects these video terminals together via communication lines. Each of the video terminals is arranged to select the type of image to be displayed on the main screen, and the multipoint control unit is arranged to determine a display position of the subscreen, depending on the type of main screen image. As a result, the subscreen can be always displayed at an optimum position relative to the main screen.

The video terminal communication system of the invention comprises video terminals which establish a point-to-point connection via a communication line. Each of the video terminals is arranged to comprise: transmission means for transmitting a display mode specification command to the other video terminal via the communication line, with a screen layout of the main screen and the subscreen being optimized by the optimizing means and specified by the display mode specification command; receiving means for receiving a display mode specification command which is transmitted from the other video terminal via the communication line; and switching means for switching screen layouts in accordance with the display mode specification command which is received by the receiving means. Therefore, if the user of a terminal wishes to send data or the like to the user of the other terminal, the data can be displayed at the other terminal in an optimum screen layout, without any manipulation by the user of the other terminal.

Again, the video conferencing system of the invention comprises multiple video terminals, and a multipoint control unit which connects these video terminals together via communication lines. Each of the video terminals is arranged to comprise: transmission means for transmitting display mode specification commands to the multipoint control unit via one of the communication lines, with a screen layout of the main screen and the subscreen being optimized by the optimizing means and specified by the display mode specification commands; receiving means for receiving a display mode specification command which is transmitted from the multipoint control unit via the one communication line; and switching means for switching screen layouts in accordance with the display mode specification command which is received by the receiving means. The multipoint control unit is arranged to comprise relay means for receiving the display mode specification commands from each video terminal and transmitting them to the other video terminals. Therefore, if the user of a terminal wishes to send data or the like for a meeting to the users of the other terminals, the data for a meeting can be displayed at the other terminals in an optimum screen layout, without any manipulation by the users of the other terminals.

DESCRIPTION OF THE PREFERRED EMBODIMENTS

Embodiments of the invention are hereinafter described with reference to the drawings.

Figure 1:
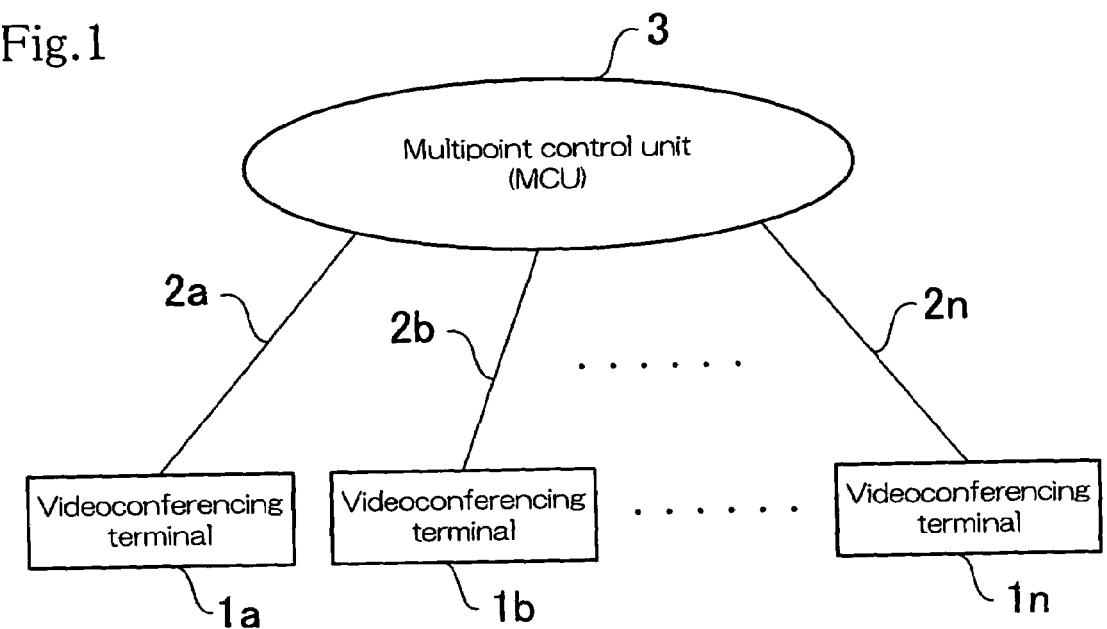
FIG. 1 is an explanatory view showing the overall configuration of a video conferencing system which employs video terminals of the invention.

FIG. 1 is an explanatory view showing the overall configuration of a video conferencing system which employs video terminals of the invention.

This video conferencing system comprises multiple video terminals (hereinafter called "video conferencing terminals") 1a, 1b . . . 1n, and a multipoint control unit (MCU) 3 which connects the multiple video conferencing terminals 1a, 1b . . . 1n via communication lines 2a, 2b . . . 2n.

Figure 2:
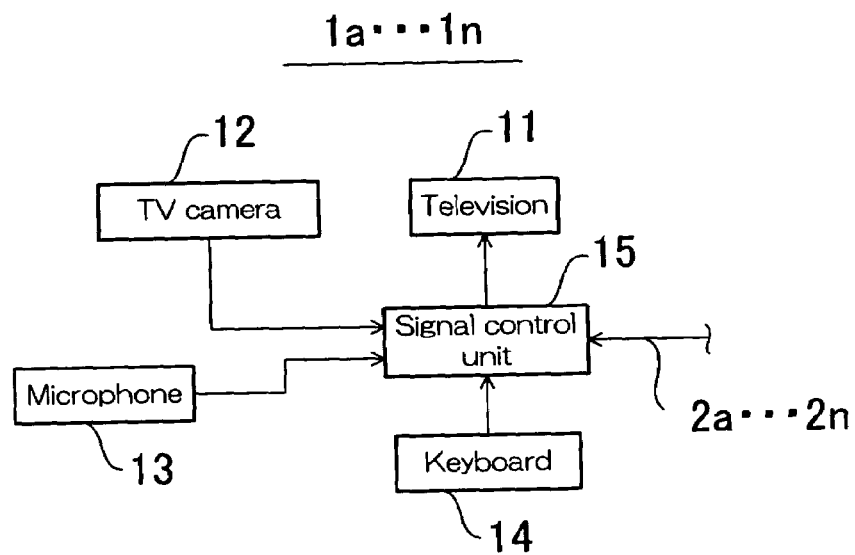
FIG. 2 is a more specific block diagram showing the configuration of a video conferencing terminal.

As shown in FIG. 2, each of the video conferencing terminals 1a, 1b . . . 1n is constituted with a television 11 which is used as a picture information display unit and an audio information output unit, a television camera 12 as a picture information acquisition unit, a microphone 13 as an audio information acquisition unit, a keyboard 14 as a text information input unit, and a signal control unit 15 such as a multiplexer. The signal control unit 15 is interposed between and connected to these components and their corresponding communication lines 2a, 2b . . . 2n, and controls input and output of signals across those components and their communication lines 2a, 2b . . . 2n. To give another example, the video conferencing terminals 1a, 1b . . . 1n may be personal computers each of which is composed of a display unit, a speaker, a camera, a microphone, a keyboard and an internal modem.

The communication line may be an ISDN (Integrated Services Digital Network) line or a high-speed digital leased line, to name a few.

In the video conferencing system of this arrangement, each of the video conferencing terminals 1a, 1b . . . 1n can simultaneously display images from four locations including the own terminal, with a screen of the television 11 (hereinafter called "television screen") being split into four sections. In addition, the present embodiments enable a 1/9-size subscreen to appear within a main screen (a full screen or the whole of the four-split composite screen).

The keyboard 14 is equipped with a selection key (not shown) for selecting the types of images to be displayed on the main screen and the subscreen. Also provided is switching means which automatically switches the screen layouts (display size and display position) of the main screen and the subscreen, based on the manipulation of the selection key. As the switching means, the present embodiments adopt the signal control unit 15. In the case of a personal computer, the switching means is realized by a system controller which controls the entire computer operations. Further, the switching means executes an operation according to a display mode switchover process program which is stored in an internal ROM (not shown). Incidentally, the display modes for the main screen include a full screen view (where a single section occupies the entire screen) and a four-split view. The types of main screen include an incoming animation and a still image, whereas the types of subscreen include an incoming animation, an outgoing animation and a still image.

Figure 3:
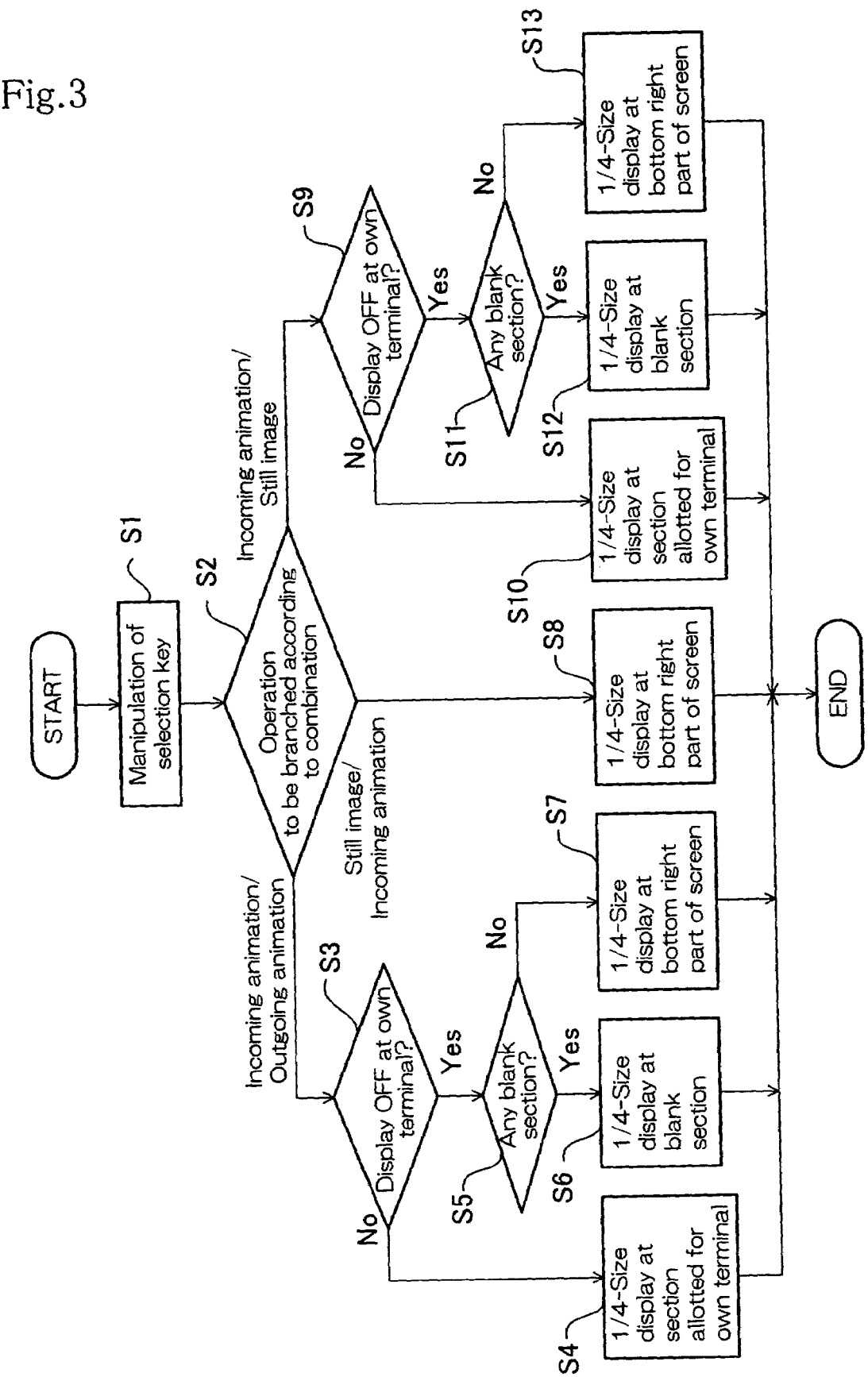
FIG. 3 is a flowchart which illustrates display mode switchover operations at each video conferencing terminal employed in a video conferencing system.
Figure 4:
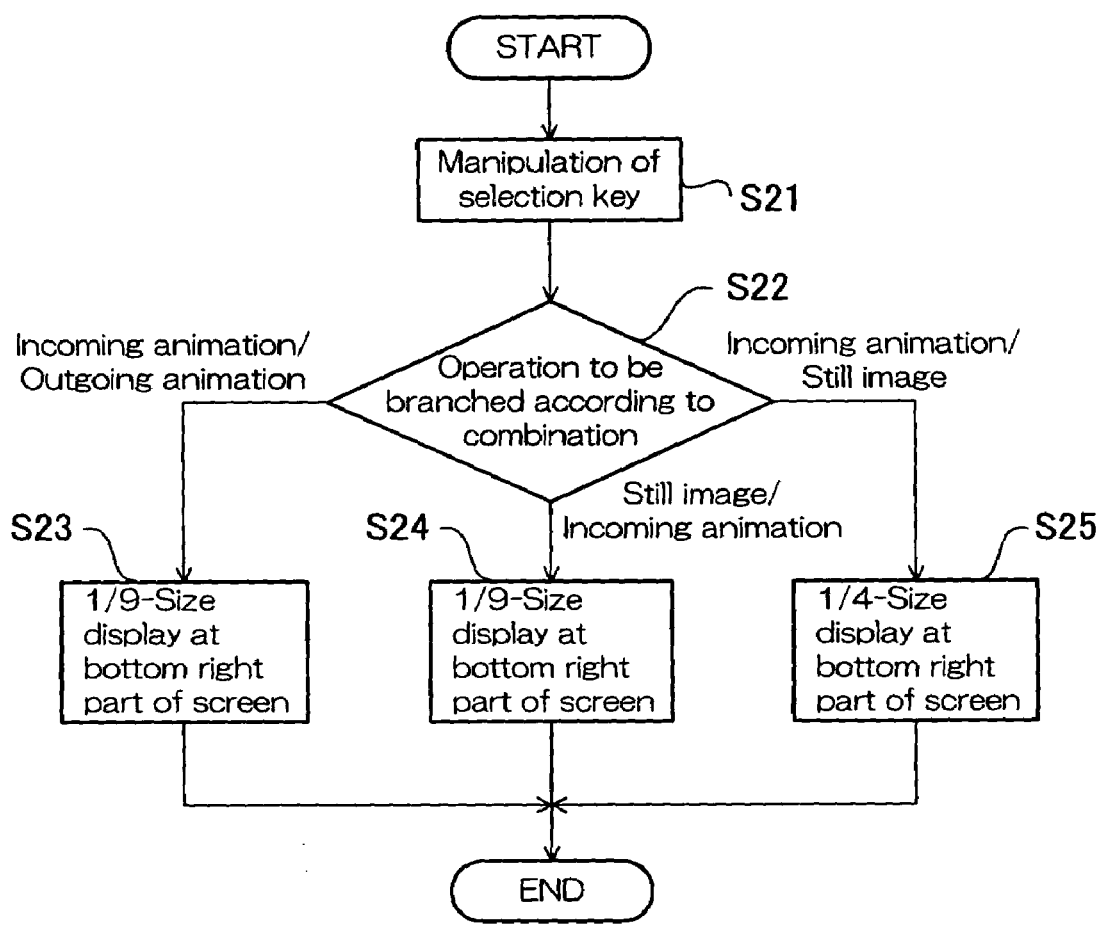
FIG. 4 is a flowchart which illustrates display mode switchover operations at each video conferencing terminal employed in a video conferencing system.

With regard to the video conferencing system of the above arrangement, each of the video conferencing terminals 1a, 1b . . . 1n performs display mode switchover operations, as detailed below with reference to the flowcharts in FIG. 3 and FIG. 4. The flowchart in FIG. 3 concerns the case where the main screen is in a four-split composite screen mode, whereas the flowchart in FIG. 4 concerns the case where the main screen is in a full screen mode.

As mentioned already, the display modes for the main screen include a full screen view (where a single section occupies the entire screen) and a four-split view. The types of main screen include an incoming animation and a still image, whereas the types of subscreen include an incoming animation, an outgoing animation and a still image.

Under such circumstances in the present embodiments, the combination of the main screen and the subscreen (main screen/subscreen) is selectable from three types: (1) Incoming animation/Outgoing animation, (2) Still image/Incoming animation, and (3) Incoming animation/Still image. In addition, the full screen mode and the four-split composite screen mode are available for an incoming animation or animations. To be specific, the MCU 3 adopts the full screen mode and the four-split composite screen mode, while the point-to-point connection between the video conferencing terminals 1a, 1b . . . 1n adopts the full screen mode.

[1] When the main screen is in the four-split composite screen mode

In this case, the selection key is manipulated (S1) to show incoming animations on the main screen in the four-split composite screen mode and to show an outgoing animation on the subscreen (S2). Based on this selected combination, the display mode switching means allows an outgoing animation to be displayed on a 1/4-size subscreen, at a section allotted to the own terminal (S3 to S4). At this stage, if the display is off in the section for the own terminal (Yes in S3) and also if the four-split composite screen has a blank section (Yes in S5), the outgoing animation is shown on a 1/4-size subscreen at the blank section (S6). If there is no blank section (No in S5), the outgoing animation is forced to appear on a 1/4-size subscreen, at the bottom right part of the screen (S7). In addition, if the locational information is unavailable, the outgoing animation is forced to appear on a 1/4-size subscreen, at the bottom right part of the screen.

In another case, suppose that the selection key is manipulated (S1) to show still images on the main screen and to select an incoming animation on the subscreen (S2). Based on this selected combination, the display mode switching means forces an incoming animation to appear on a 1/4-size subscreen, at the bottom right part of the screen (S8).

In yet another case, suppose that the selection key is manipulated (S1) to show incoming animations on the main screen in the four-split composite screen mode and to show a still image on the subscreen (S2). Based on this selected combination, the display mode switching means allows a still image to be displayed on a 1/4-size subscreen, at a section allotted to the own terminal (S9 to S10). At this stage, if the display is off in the section for the own terminal (Yes in S9) and also if the four-split composite screen has a blank section (Yes in S11), the still image is shown on a 1/4-size subscreen at the blank section (S12). If there is no blank section (No in S11), the still image is forced to appear on a 1/4-size subscreen, at the bottom right part of the screen (S13). In addition, if the locational information is unavailable, the still image is forced to appear on a 1/4-size subscreen, at the bottom right part of the screen.

[2] When the main screen is in the full screen mode

In this case, the selection key is manipulated (S21) to show an incoming animation on the main screen in the full screen mode and to show an outgoing animation on the subscreen (S22). Based on this selected combination, the display mode switching means allows an outgoing animation to appear on a 1/9-size subscreen, at the bottom right part of the screen (S23).

In another case, suppose that the selection key is manipulated (S21) to show a still image on the main screen in the full screen mode and to show an incoming animation on the subscreen (S22). Based on this selected combination, the display mode switching means allows an incoming animation to appear on a 1/9-size subscreen, at the bottom right part of the screen (S24).

In yet another case, suppose that the selection key is manipulated (S21) to show an incoming animation on the main screen in the full screen mode and to show a still image on the subscreen (S22). Based on this selected combination, the display mode switching means allows a still image to appear on a 1/4-size subscreen, at the bottom right part of the screen (S25).

Concerning the above embodiments, the size of the subscreen is selected from 1/4 or 1/9. However, these sizes are merely given for the purpose of description and should not be construed to limit the subscreen size. Besides, the initial display position of the subscreen should not be limited to the bottom right part of the display. Further, the main screen may be split into any number of sections, instead of four. To put it simply, the greatest feature of the invention is to automatically optimize the screen layouts in the following manner. First, when the subscreen shows a still image, the subscreen is enlarged in size (1/4-size in the above-described operations) as compared with conventional subscreens, in order to ensure a clear view of the subscreen. Second, when the main screen is in the full screen mode, the subscreen is diminished in size (1/9-size in the above-described operations) so as not to obstruct the main screen.

Regarding the display mode switching process by the switching means, the display size and display position as mentioned above should be understood to refer to the initial size and position in response to the manipulation of the selection key. Later, a user can change the display size and display position at his/her will by manipulating the keyboard 14 or the like, as in the conventional cases.

As far as the above-described operations are concerned, the selections are effected at the own terminal alone. However, considering the use of the video conferencing terminals 1a, 1b . . . 1n in the video conferencing system, it is convenient if the main screen/subscreen combination can be selected at the own terminal and then can be automatically set to the other terminals connected by the MCU +3. From this point of view, the present invention is arranged to transmit display mode specification commands which specify a main screen/subscreen combination selected at the own terminal, from the own terminal to the other terminals via their communication lines 2a, 2b . . . 2n and the MCU +3. On receiving the display mode specification commands, the other terminals execute the above operations (the operations shown in FIG. 3 and FIG. 4), according to the main screen/subscreen combination specified by the display mode specification commands. Eventually, each of the other terminals selectively displays the main screen and the subscreen, just as the selection is made by the keyboards 14 of its own terminal. In order to enable transmission and receipt of the display mode specification commands across the terminals, the MCU 'additionally needs to have relay means for relaying the display mode specification commands. This arrangement corresponds to claim 6. Moreover, where any two video conferencing terminals establish a point-to-point connection via a communication line without interposition of the MCU +3, a display mode specification command can be sent and received as well. This arrangement corresponds to claim 5.

INDUSTRIAL APPLICABILITY

As described above, the video terminal, the video terminal communication system and the video conferencing system concerning the present invention are suitable for use in a video conference.

The invention claimed is:

1. A video conferencing system comprising:
   a communication line; and
   a plurality of video terminals interconnected in a point-to-point manner via said communication line, each of said video terminals being operable to display a subscreen within a main screen, and each of said video terminals including:
      an optimizing section operable to optimize a screen layout of the main screen and the subscreen based on a type of image to be displayed on the main screen and the subscreen, and operable to optimize a screen layout of the main screen and the subscreen of at least one other of said video terminals so as to result in a display mode specification command;
      a transmission section operable to transmit the display mode specification command to said at least one other of said video terminals via said communication line, wherein a screen layout is specified by the display mode specification command;
      a receiving section operable to receive a display mode specification command transmitted from at least one other of said video terminals via said communication line; and
      a switching section operable to switch a screen layout in accordance with the display mode specification command received by said receiving section.

2. A video conferencing system according to claim 1, wherein said optimizing section is operable to enlarge the subscreen when the subscreen displays a still image.

3. A video conferencing system according to claim 2, wherein:
   said optimizing section is operable to locate the subscreen in any one section of a split-composite screen when the main screen is in a split-composite screen mode; and
   said optimizing section is operable to diminish the subscreen when the main screen is in a full screen mode.

4. A video conferencing system according to claim 1, wherein:
   said optimizing section is operable to locate the subscreen in any one section of a split-composite screen when the main screen is in a split-composite screen mode; and
   said optimizing section is operable to diminish the subscreen when the main screen is in a full screen mode.

5. A video conferencing system comprising:
   a communication line;
   a multipoint control unit;
   a plurality of video terminals connected to said multipoint control unit via said communication line, each of said video terminals being operable to display a subscreen within a main screen, and each of said video terminals including:
      an optimizing section operable to optimize a screen layout of the main screen and the subscreen based on a type of image to be displayed on the main screen and the subscreen, and operable to optimize a screen layout of the main screen and the subscreen of at least one other of said video terminals so as to result in a display mode specification command;
      a transmission section operable to transmit the display mode specification command to said multipoint control unit via said communication line, wherein a screen layout is specified by the display mode specification command;
      a receiving section operable to receive a display mode specification command transmitted from said multipoint control unit via said communication line; and
      a switching section operable to switch a screen layout in accordance with the display mode specification command received by said receiving section;
   wherein said multipoint control unit comprises a relay section operable to receive the display mode specification command from at least one other of said video terminals, and transmit the display mode specification command to at least one of other said video terminals.

6. A video conferencing system according to claim 5, wherein said optimizing section is operable to enlarge the subscreen when the subscreen displays a still image.

7. A video conferencing system according to claim 6, wherein:
   said optimizing section is operable to locate the subscreen in any one section of a split-composite screen when the main screen is in a split-composite screen mode; and
   said optimizing section is operable to diminish the subscreen when the main screen is in a full screen mode.

8. A video conferencing system according to claim 7, wherein:
   each of said video terminals is operable to select the type of image to be displayed on the main screen; and
   said multipoint control unit is operable to determine the display position of the subscreen of each of said video terminals, depending upon the type of image selected to be displayed on the main screen.

9. A video conferencing system according to claim 5, wherein:
   said optimizing section is operable to locate the subscreen in any one section of a split-composite screen when the main screen is in a split-composite screen mode; and
   said optimizing section is operable to diminish the subscreen when the main screen is in a full screen mode.

10. A video conferencing system according to claim 9, wherein:
   each of said video terminals is operable to select the type of image to be displayed on the main screen; and
   said multipoint control unit is operable to determine the display position of the subscreen of each of said video terminals, depending upon the type of image selected to be displayed on the main screen.

11. A video conferencing system according to claim 5, wherein:
   each of said video terminals is operable to select the type of image to be displayed on the main screen; and
   said multipoint control unit is operable to determine the display position of the subscreen of each of said video terminals, depending upon the type of image selected to be displayed on the main screen.

12. A video conferencing system according to claim 11, wherein said optimizing section is operable to enlarge the subscreen when the subscreen displays a still image.

13. A video terminal operable to interface to another video terminal in a point-to-point manner via a communication line, operable to display a subscreen within a main screen, said video terminal comprising:
- an optimizing section operable to optimize a screen layout of the main screen and the subscreen based on a type of image to be displayed on the main screen and the subscreen, and operable to optimize a screen layout of the main screen and the subscreen of at least one other of said video terminals so as to result in a display mode specification command;
- a transmission section operable to transmit the display mode specification command to said at least one other of said video terminals via the communication line, wherein a screen layout is specified by the display mode specification command;
- a receiving section operable to receive a display mode specification command transmitted from at least one other of said video terminals via the communication line; and
- a switching section operable to switch a screen layout in accordance with the display mode specification command received by said receiving section.

14. A video terminal operable to interface with a multipoint control unit which is operable to connect to multiple video terminals via a communication line, wherein said video terminal is capable of displaying a subscreen within a main screen, said video terminal comprising:
- an optimizing section operable to optimize a screen layout of the main screen and the subscreen based on a type of image to be displayed on the main screen and the subscreen, and operable to optimize a screen layout of the main screen and the subscreen of at least one of other said video terminals so as to result in a display mode specification command;
- a transmission section operable to transmit the display mode specification command to said multipoint control unit via the communication line, wherein a screen layout is specified by the display mode specification command;
- a receiving section operable to receive a display mode specification command transmitted from said multipoint control unit via the communication line; and
- a switching section operable to switch a screen layout in accordance with the display mode specification command received by said receiving section;
- wherein said multipoint control unit comprises a relay section operable to receive the display mode specification command from at least one other of said video terminals, and transmit the display mode specification command to at least one of other said video terminals.

* * * * *